UNITED STATES PATENT OFFICE.

JAMES C. ANDERSON, OF HIGHLAND PARK, ILLINOIS.

ORNAMENTAL BRICK.

SPECIFICATION forming part of Letters Patent No. 407,146, dated July 16, 1889.

Application filed August 6, 1887. Renewed November 26, 1888. Serial No. 291,931. (No specimens.)

*To all whom it may concern:*

Be it known that I, JAMES C. ANDERSON, a citizen of the United States of America, residing at Highland Park, in the county of Lake and State of Illinois, have invented certain new and useful Improvements in Ornamental Bricks, of which the following is a specification.

My invention relates to the manufacture of ornamental bricks for architectural and other purposes; and the object of my invention is to produce bricks of a highly-ornamental character, having the main body to present the appearance and character of bronze, showing the actual dross of the metal upon the surface thereof in the form of spots or blotches.

My invention consists of a brick composed of clay and small particles of phosphor-bronze, the same being fused in the burning of the brick and leaving the dross in the form of spots or splotches on the surface of the brick, while the main body assumes the color of the bronze.

In carrying out my invention, and to produce the best results, a pure clay is used in which there is none, or practically none, of the metallic oxides, and which in its natural state will burn to a white or slightly buff color. The clay is reduced to a fine dry powdered condition by any suitable mechanical means, and to each one hundred (100) parts I add about five (5) parts of phosphor-bronze in a finely divided or comminuted condition in the form of coarse filings or sawings or fine chippings and intimately mix the same with the previously-prepared clay-powder, so as to form a homogeneous mass. The clay and finely-disintegrated phosphor-bronze thus prepared are submitted to an intense pressure while in a dry state in suitable molds, to bring it to the desired form and to eliminate the air therefrom. The bricks, blocks, or other shapes thus formed are now placed in a suitable kiln and fired to a degree of heat which will burn the brick to the desired hardness and fuse the metal, causing it to impart its color to the main body of the brick and at the same time deposit the dross of the metal on the surface of the brick in the shape of spots or blotches.

The different shades of color in the main body of the brick may be varied by changing the proportions of comminuted bronze mixed with the clay, or other effects may be obtained by using a small portion of the metallic oxides in a finely-powdered condition thoroughly incorporated with the clay in the dry state, as described in my patent, No. 262,339, of August 8, 1882, before mixing the clay mass with the finely-divided phosphor-bronze. For example, to produce an antique bronze effect, I add oxides of copper and cobalt to give the green and blue tint necessary.

Bricks produced by the method just described will be found to have the actual appearance of a beautiful bronze metal, as well as to possess much of the characteristics of bronze metal in body texture.

The metals present are not oxidized but fused within the clay body in the metallic state by the burning process and remain in the brick as metals. The color imparted to the brick does not exhibit the color of the oxide of the metal, but the color of the metal itself and the melted dross of the metal, which metal colors and drosses go to make up the distinctive character of the brick claimed.

I am aware that it is not new to use the oxides of metal to give color to brick, and such I do not claim.

In an application filed by me December 21, 1888, Serial No. 294,304, I have claimed the composition from which the brick is made.

Having thus described my invention, what I claim, and desire to secure by Letters Patent, is—

A brick for architectural purposes the body color of which is bronze and the surface of which is spotted or splotched with the dross of the metal contained therein, as set forth.

In testimony whereof I affix my signature in presence of two witnesses.

J. C. ANDERSON.

Witnesses:
J. C. CUSHMAN,
JNO. D. ONDERDONK.